US010893178B2

(12) United States Patent
Park et al.

(10) Patent No.: US 10,893,178 B2
(45) Date of Patent: Jan. 12, 2021

(54) CAMERA MODULE

(71) Applicant: SAMSUNG ELECTRO-MECHANICS CO., LTD., Suwon-si (KR)

(72) Inventors: Chuel Jin Park, Suwon-si (KR); Soo Cheol Lim, Suwon-si (KR); Jung Seok Lee, Suwon-si (KR); Sang Ho Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/914,578

(22) Filed: Mar. 7, 2018

(65) Prior Publication Data

US 2018/0343370 A1 Nov. 29, 2018

(30) Foreign Application Priority Data

May 25, 2017 (KR) .................. 10-2017-0064774
Aug. 18, 2017 (KR) .................. 10-2017-0105049

(51) Int. Cl.
| | |
|---|---|
| *H04N 5/225* | (2006.01) |
| *G02B 13/00* | (2006.01) |
| *G03B 3/10* | (2006.01) |
| *G03B 9/04* | (2006.01) |
| *G03B 9/06* | (2006.01) |

(52) U.S. Cl.
CPC ......... *H04N 5/2254* (2013.01); *G02B 13/001* (2013.01); *G03B 3/10* (2013.01); *G03B 9/04* (2013.01); *G03B 9/06* (2013.01); *H04N 5/2253* (2013.01)

(58) Field of Classification Search
CPC .. H04N 5/2254; H04N 5/2253; G02B 13/001; G03B 3/10
See application file for complete search history.

(56) References Cited

U.S. PATENT DOCUMENTS

| | | | |
|---|---|---|---|
| 4,922,274 A | 5/1990 | Yamamoto et al. | |
| 5,099,334 A * | 3/1992 | Ogata ................ | H04N 5/238 348/362 |
| 10,237,458 B2 | 3/2019 | Lim et al. | |

(Continued)

FOREIGN PATENT DOCUMENTS

| | | |
|---|---|---|
| CN | 101644809 A | 2/2010 |
| CN | 204595296 U | 8/2015 |

(Continued)

OTHER PUBLICATIONS

Chinese Office Action dated Feb. 3, 2020 in counterpart Chinese Patent Application No. 2018104684.8 (16 pages in English and 12 pages in Chinese).

(Continued)

*Primary Examiner* — Antoinette T Spinks
(74) *Attorney, Agent, or Firm* — NSIP Law

(57) ABSTRACT

A camera module includes: a lens module disposed in a housing and a stop module coupled to the lens module. The stop module includes apertures having different diameters from each other so as to selectively change an amount of light incident on the lens module, a magnet portion to select any one of the apertures by movement of the magnet portion, and a coil disposed on the housing facing the magnet portion to move the magnet portion.

19 Claims, 10 Drawing Sheets

(56) References Cited

U.S. PATENT DOCUMENTS

| | | | |
|---|---|---|---|
| 10,690,997 B2* | 6/2020 | Park | H04N 5/2254 |
| 2005/0058444 A1 | 3/2005 | Watanabe et al. | |
| 2014/0192251 A1 | 7/2014 | Speltz et al. | |
| 2017/0324892 A1* | 11/2017 | Kim | H04N 5/2252 |
| 2018/0069995 A1* | 3/2018 | Lim | G03B 42/00 |
| 2018/0284571 A1* | 10/2018 | Park | H04N 5/2252 |
| 2018/0341166 A1* | 11/2018 | Imai | G03B 9/10 |
| 2020/0064711 A1* | 2/2020 | Kim | G03B 9/06 |

FOREIGN PATENT DOCUMENTS

| | | |
|---|---|---|
| CN | 105991908 A | 10/2016 |
| JP | 4317411 B2 | 8/2009 |
| KR | 10-0736486 B1 | 7/2007 |
| KR | 10-1700771 B1 | 1/2017 |

OTHER PUBLICATIONS

United States Office Action dated Mar. 4, 2020 in related U.S. Appl. No. 16/115,611 (10 pages in English).

Chinese Office Action dated Sep. 8, 2020 issued in counterpart to Chinese Patent Application No. 201810460804.8 (20 pages in English, 15 pages in Chinese).

* cited by examiner

CAMERA MODULE

CROSS-REFERENCE TO RELATED APPLICATIONS

This application claims the benefit under 35 USC 119(a) of Korean Patent Application Nos. 10-2017-0064774 filed on May 25, 2017, in the Korean Intellectual Property Office, the entire disclosure of which is incorporated herein by reference for all purposes, and Korean Patent Application No. 10-2017-0105049 filed on Aug. 18, 2017, in the Korean Intellectual Property Office, the entire disclosure of which is incorporated herein by reference for all purposes.

BACKGROUND

1. Field

This application relates to a camera module.

2. Description of the Background

Recently, camera modules have become standard in portable electronic devices such as tablet computers, notebook computers, eyeglasses, and the like, as well as in smartphones.

A general digital camera includes a mechanical stop to change an amount of incident light therein, depending on a photography environment, but in a camera module used in a small product such as a portable electric device, it is difficult to separately include a stop.

As an example, a weight of the camera module may be increased due to several components for driving the stop, such that an autofocusing function or image stabilization function may be deteriorated.

Further, in a case in which a circuit connection part for driving the stop is provided in the stop itself, tension may act on the circuit connection part depending on vertical movement of a lens at the time of performing the autofocusing function, such that there may be a problem in the autofocusing function.

The above information disclosed in this Background section is only for enhancement of understanding of the background of the disclosure and therefore it may contain information that does not form any part of the prior art nor what the prior art may suggest to a person of ordinary skill in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module disposed in a housing and a stop module coupled to the lens module. The stop module includes apertures having different diameters from each other configured to selectively change an amount of light incident on the lens module, a magnet portion configured to select any one of the apertures by movement of the magnet portion, and a coil disposed on the housing facing the magnet portion, and configured to move the magnet portion.

The stop module may further include a base and a first plate comprising a first through hole and a second plate comprising a second through hole disposed on the base. The first and second through holes may be configured to form the apertures.

The first and second plates may be disposed in an optical axis direction.

Each of the first and second through holes may have a shape of connected non-concentric through holes having different diameters.

The apertures may include the first through hole overlapped with the second through hole.

The first and second plates may be configured to move in directions opposite to each other by movement of the magnet portion.

A first projection portion may penetrate through the first and second plates and be disposed on the magnet portion.

The first plate may include a first guide hole through which the first projection portion passes and the second plate may include a second guide hole through which the first projection portion passes. The first and second guide holes may be inclined with respect to a moving direction of the magnet portion and directions of inclination of the first and second guide holes may be opposite to each other.

A second projection portion may be disposed on the base, the first plate may include a third guide hole into which the second projection portion is inserted, and the second plate may include a fourth guide hole into which the second projection portion is inserted. The third and fourth guide holes may extend in a length direction perpendicular to a moving direction of the magnet portion.

The stop module may further include a cover covering the base and the first and second plates.

The lens module and the stop module may be configured to be movable together in an optical axis direction. The lens module and the stop module may be configured to be movable together in first and second directions perpendicular to the optical axis direction.

In another general aspect, a camera module includes a lens module disposed in a housing and a stop module coupled to the lens module. The stop module includes a base, first and second plates each including a through hole, the first and second plates stacked and disposed on the base, a magnet portion configured to be movable with respect to the base, and a coil disposed on the housing facing the magnet portion, and configured to move the magnet portion. The through hole of the first plate and the through hole of the second plate overlap each other in an optical axis direction to selectively form apertures having different diameters from each other. Any one of the apertures being selected by movement of the magnet portion Each through hole may have a shape of connected non-concentric through holes comprising different diameters, and the first and second plates may be configured to move in directions opposite to each other by movement of the magnet portion.

A support portion disposed on the base may contact and support the magnet portion.

In another general aspect, a camera module includes a housing, a lens module movably disposed in the housing, a stop module disposed on the lens module, and having a magnet portion movable to select an aperture size from contiguous through holes in plates, and a coil disposed on the housing spaced apart from the stop module, and configured to move the magnet portion.

The plates may be configured to selectively slide over one another to first and second positions in response to movement of the magnet portion. In the first position, first portions of the through holes may overlap to form a first aperture, and in the second position, second portions of the through holes may overlap to form a second aperture in a substantially same position on an optical axis as the first aperture.

The magnet portion may be configured to move in a first axis direction substantially perpendicular to an optical axis direction, and the plates may be configured to move in a direction substantially perpendicular to the first axis and the optical axis directions, and in directions opposite to one another in response to movement of the magnet portion.

The plates may include inclined slots coupled to a first projection portion disposed on the magnet portion, and non-inclined slots coupled to a second projection portion disposed in a constant position relative to the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

An aspect of the present disclosure provides a camera module capable of selectively changing an amount of incident light with a stop module and preventing performance of an autofocusing or image stabilization function from being deteriorated even in the case that the stop module is mounted therein.

An aspect of the present disclosure also provides a camera module capable of significantly reducing an increase in weight due to adaptation of the stop module.

A camera module according to an exemplary embodiment in the present disclosure may be mounted in a portable electronic device such as a mobile communications terminal, a smartphone, a tablet computer, glasses, or the like.

Figure 1:
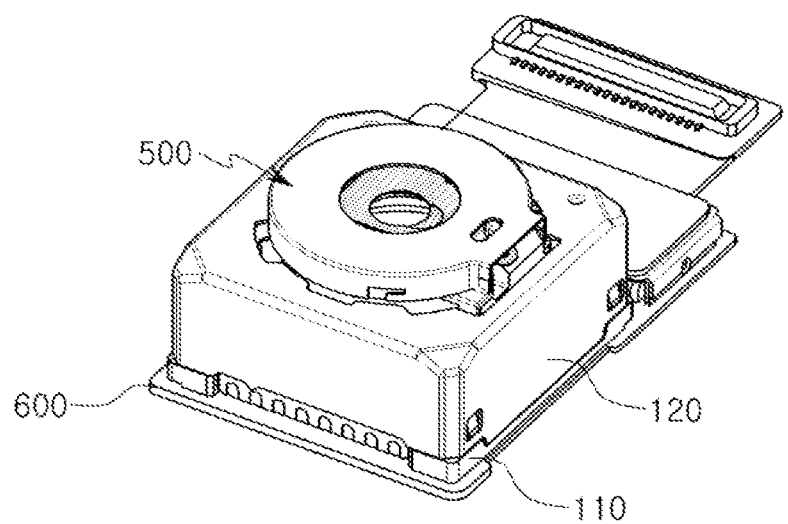
FIG. 1 is a perspective view of an example camera module.
Figure 2:
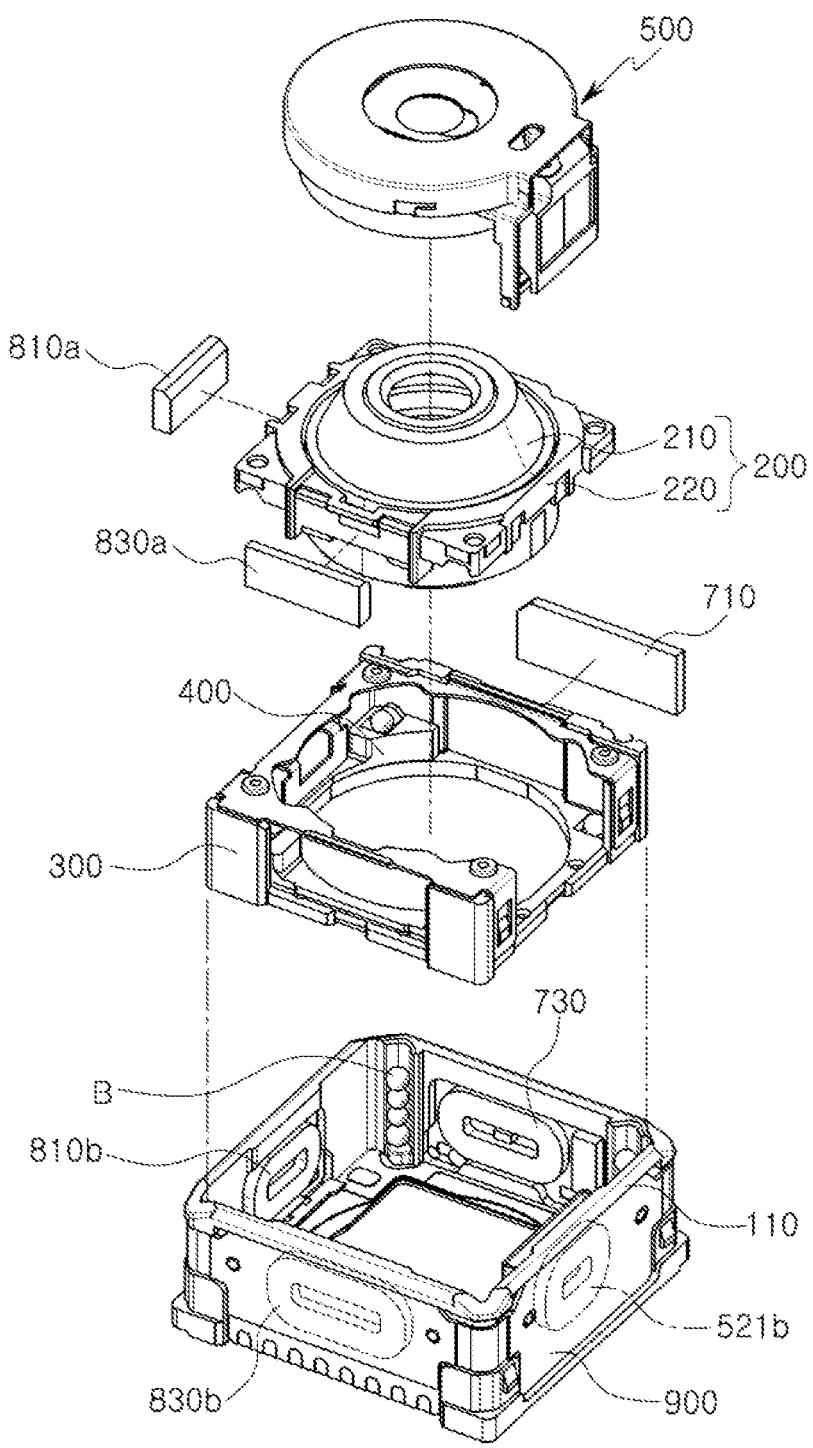
FIG. 2 is an exploded perspective view of the camera module of FIG. 1.

FIG. 1 is a perspective view of an example camera module according to the present disclosure, and FIG. 2 is an exploded perspective view of the camera module of FIG. 1.

Figure 3A:
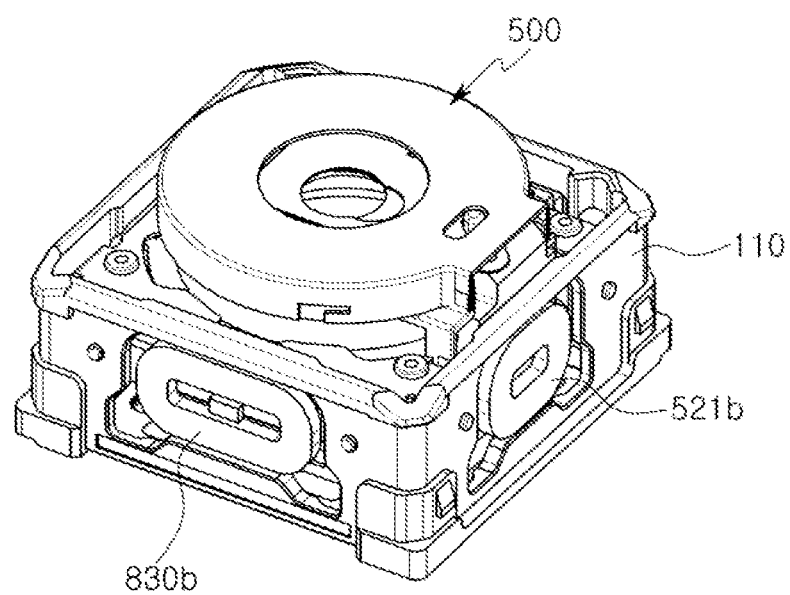
FIG. 3A is a perspective view illustrating a portion of the camera module of FIG. 1.
Figure 3B:
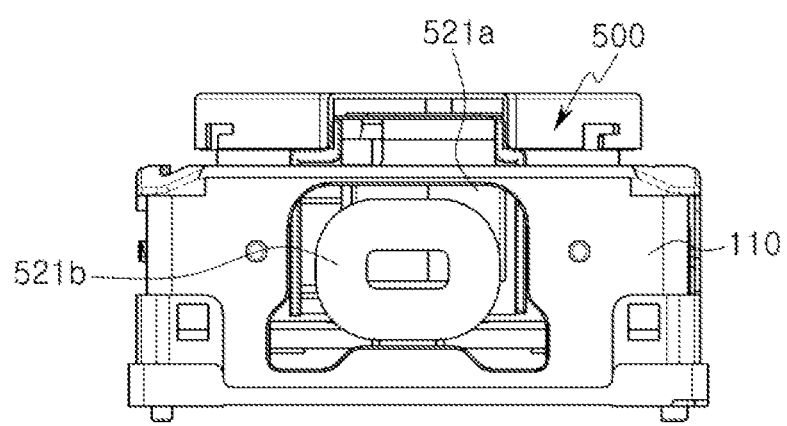
FIG. 3B is a side view of FIG. 3A.

FIG. 3A is a perspective view illustrating a portion of the camera module of FIG. 1 and FIG. 3B is a side view of FIG. 3A.

Referring to FIGS. 1 through 3B, the example camera module includes a lens module 200, a carrier 300, a guide part 400, a stop module 500, a housing 110, and a case 120.

The lens module 200 includes a lens barrel 210 including lenses for imaging a subject and a holder 220 coupled to the lens barrel 210. The lenses are disposed in the lens barrel 210 on an optical axis.

The lens module 200 is accommodated in the carrier 300.

The lens module 200 is formed to be movable in an optical axis direction in order to adjust a focus.

As an example, the lens module 200 is moved together with the carrier 300 in the optical axis direction by a focus adjustment part.

The focus adjustment part includes a magnet 710 and a coil 730 which generate driving force in the optical axis direction.

The magnet 710 is mounted on the carrier 300. As an example, the magnet 710 is mounted on one surface of the carrier 300.

The coil 730 is mounted on the housing 110. As an example, the coil 730 is fixed to the housing 110 so as to face the magnet 710. The coil 730 is provided on a board 900, and the board 900 is mounted on the housing 110.

The magnet 710 is a movable member mounted on the carrier 300 and moves together with the carrier 300 in the optical axis direction, and the coil 730 is a fixed member fixed to the housing 110.

When power is applied to the coil 730, the carrier 300 is moved in the optical axis direction by electromagnetic interaction between the magnet 710 and the coil 730.

Since the lens module 200 is accommodated in the carrier 300, the lens module 200 is also moved together with the carrier 300 in the optical axis direction by movement of the carrier 300.

A rolling member B is disposed between the carrier 300 and the housing 110 to decrease friction between the carrier 300 and the housing 110 when the carrier 300 is moved. The rolling member B may have a ball shape or a cylindrical shape.

The rolling member B may be disposed on both sides of the magnet 710 (or the coil 730).

A yoke may be mounted on the board 900. As an example, the yoke is disposed to face the magnet 710 with the coil 730 interposed therebetween.

Attractive force acts between the yoke and the magnet 710 in a direction perpendicular to the optical axis direction.

Therefore, the rolling member B maintains a state of contact with the carrier 300 and the housing 110 due to the attractive force between the yoke and the magnet 710.

Further, the yoke serves to focus magnetic force of the magnet 710. Therefore, the generation of leakage magnetic flux may be prevented.

As an example, the yoke and the magnet 710 form a magnetic circuit.

The lens module 200 is moved in first and second directions perpendicular to the optical axis in order to compensate for shaking of images due to factors such as user hand-shake, or the like.

For example, at the time of capturing images, in a case in which images are shaken by the user hand-shake, or the like, a hand-shake compensation part (image stabilization part) imparts relative displacement corresponding to the hand-shake to the lens module 200 to compensate for the hand-shake.

The guide part 400 is accommodated in the carrier 300. Further, the guide part 400 and the lens module 200 are inserted into the carrier 300. When the lens module 200 is moved in the first and second directions perpendicular to the optical axis, the guide part 400 guides the lens module 200.

As an example, the guide part 400 and the lens module 200 are moved together with each other in the first direction in the carrier 300 and relative to the carrier 300, and the lens module 200 is moved in the second direction with respect to the guide part 400.

The hand-shake compensation part includes magnets 810a and 830a and coils 810b and 830b which generate driving force for hand-shake compensation.

Among the magnets 810a and 830a and the coils 810b and 830b, some magnets 810a and coils 810b are disposed to face each other in the first direction, thereby generating driving force in the first direction, and other magnets 830a and coils 830b are disposed to face each other in the second direction, thereby generating driving force in the second direction.

The magnets 810a and 830a are mounted in the lens module 200, and the coils 810b and 830b facing the magnets 810a and 830a are fixed to the housing 110. As an example, the coils 810b and 830b are provided on the board 900, and the board 900 is mounted in the housing 110.

The magnets 810a and 830a are movable members moving together with the lens module 200 in the first and second directions, and the coils 810b and 830b are fixed members fixed to the housing 110.

A ball member supporting the guide part 400 and the lens module 200 is also provided in the example camera module. The ball member serves to guide the guide part 400 and the lens module 200 during hand-shake compensation.

The ball member is provided between the carrier 300 and the guide part 400, between the carrier 300 and the lens module 200, and between the guide part 400 and the lens module 200.

When driving force is generated in the first direction, the ball member disposed between the carrier 300 and the guide part 400 and between the carrier 300 and the lens module 200 is moved in a rolling motion in the first direction. Therefore, the ball member guides movement of the guide part 400 and the lens module 200 in the first direction.

Further, when driving force is generated in the second direction, the ball member disposed between the guide part 400 and the lens module 200 and between the carrier 300 and the lens module 200 are moved in a rolling motion in the second direction. Therefore, the ball member may guide movement of the lens module 200 in the second direction.

The lens module 200 and the carrier 300 are accommodated in the housing 110.

As an example, upper and lower portions of the housing 110 are opened, and the lens module 200 and the carrier 300 are accommodated in an internal space of the housing 110.

A printed circuit board 600 on which an image sensor is mounted is disposed below the housing 110.

The case 120 is coupled to the housing 110 so as to enclose an outer surface of the housing 110, and serves to protect internal components of the camera module.

The case 120 also serves to shield electromagnetic waves.

For example, the case 120 shields the electromagnetic waves so that the electromagnetic waves generated in the camera module do not affect other electronic components in the portable electronic device.

Since various electronic components in addition to the camera module are mounted in the portable electronic device, the case 120 also shields the electromagnetic waves so that electromagnetic waves generated in these electronic components do not affect the camera module.

The case 120 may be formed of a conductor such as a metal or composite material to thereby be grounded via a ground pad provided in the printed circuit board 600, such that the case 120 may shield the electromagnetic waves.

The stop module 500 is an apparatus for selectively changing an amount of light incident on the lens module 200.

As an example, apertures having different diameters from each other are provided in the stop module 500. Light may be incident through any one of the apertures depending on photography environments.

Figure 4:
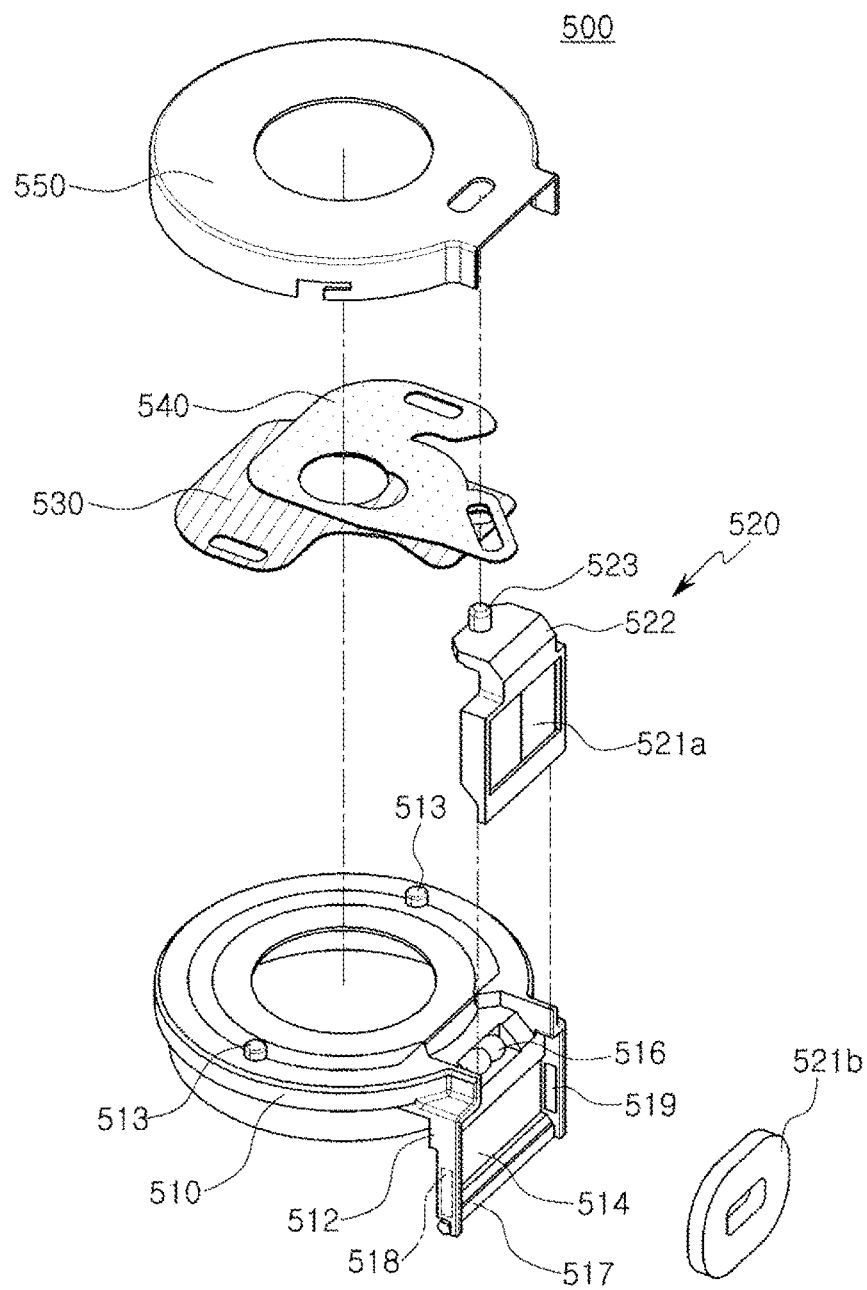
FIG. 4 is an exploded perspective view of a first example of a stop module.
Figure 5:
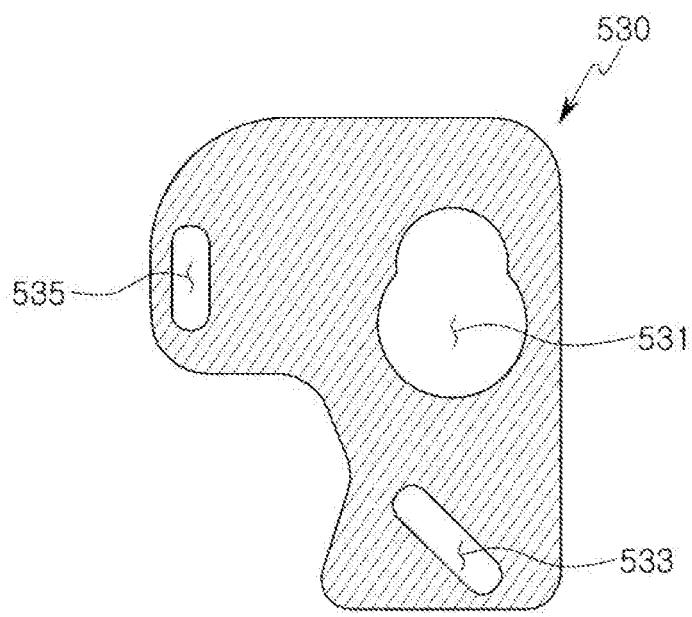
FIG. 5 is a plan view of a first plate provided in the first example of the stop module.
Figure 6:
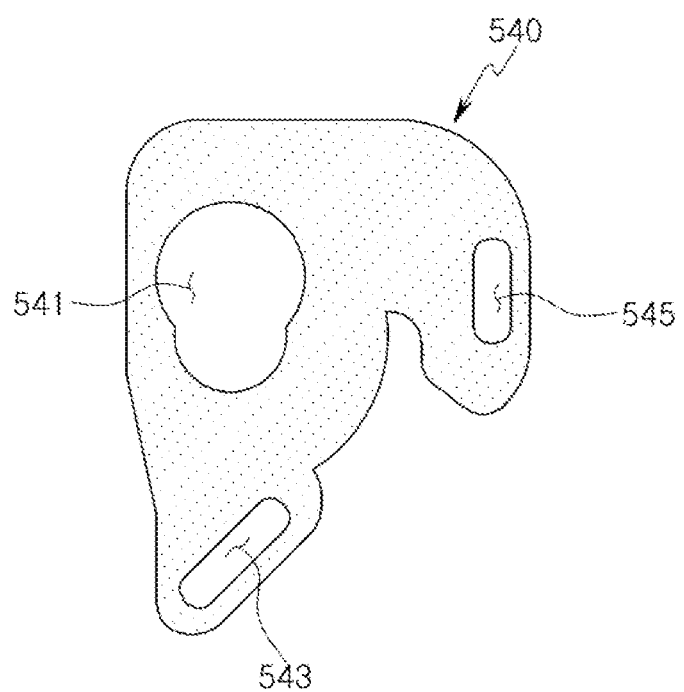
FIG. 6 is a plan view of a second plate provided in the first example of the stop module.

FIG. 4 is an exploded perspective view of a first example of the stop module, FIG. 5 is a plan view of a first plate provided in the first example of the stop module, and FIG. 6 is a plan view of a second plate provided in the first example of the stop module.

Figure 7A:
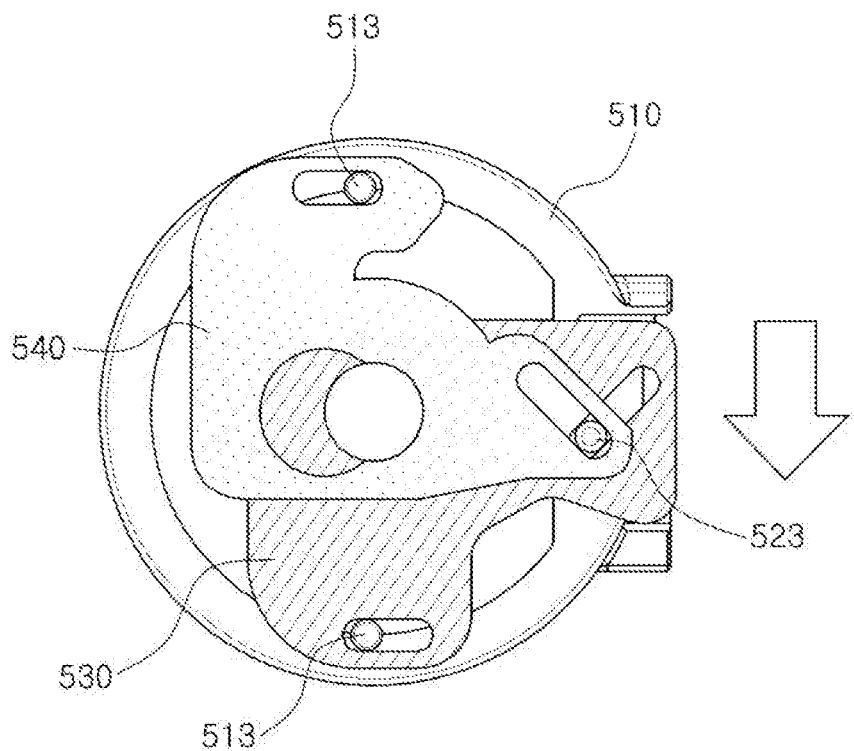
FIGS. 7A and 7B are plan views of the stop module, illustrating a state in which a diameter of an aperture through which light is incident is changed.
Figure 7B:
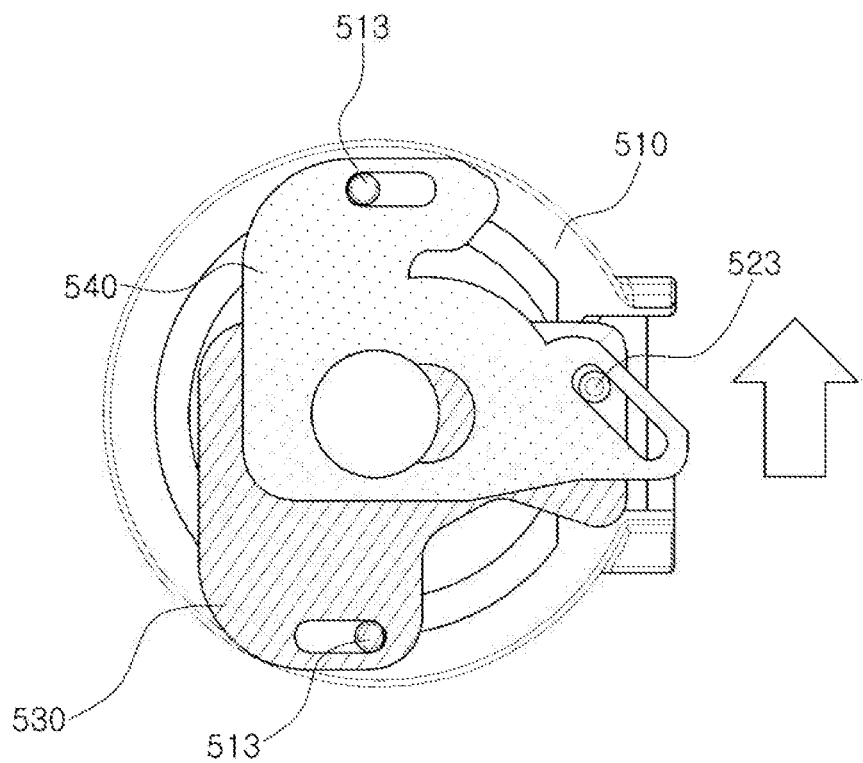

FIGS. 7A and 7B are plan views of the first example of the stop module, illustrating a state in which a diameter of an aperture through which light is incident is changed.

Figure 8:
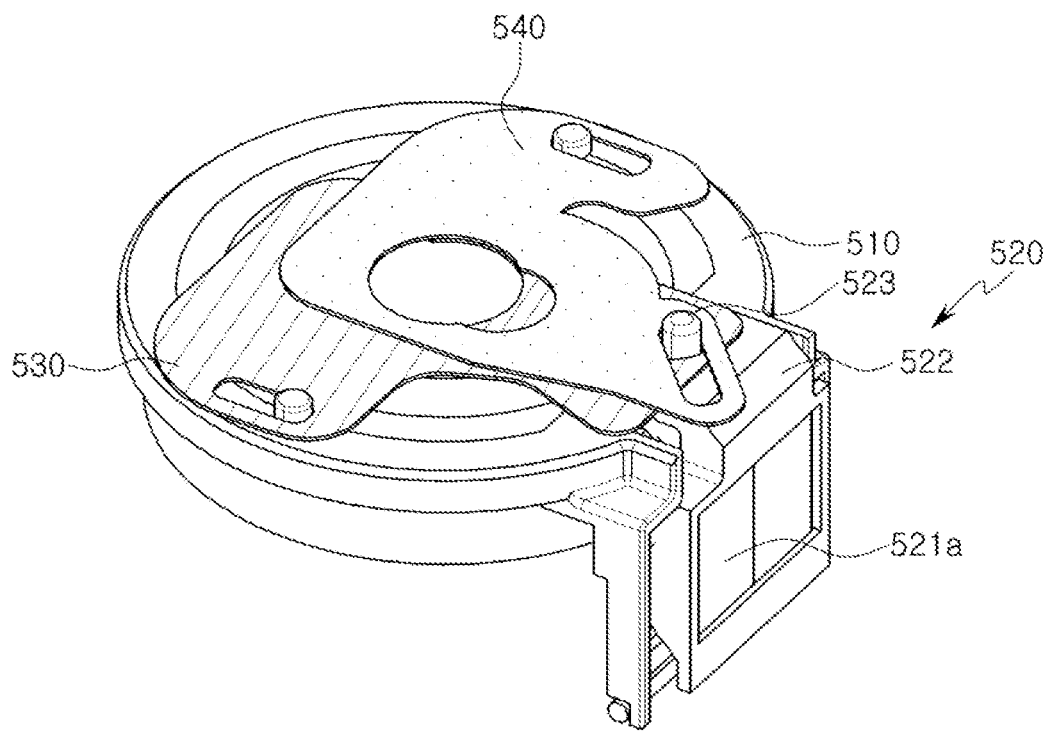
FIG. 8 is a perspective view of the stop module according to an exemplary embodiment in the present disclosure.
Figure 9:
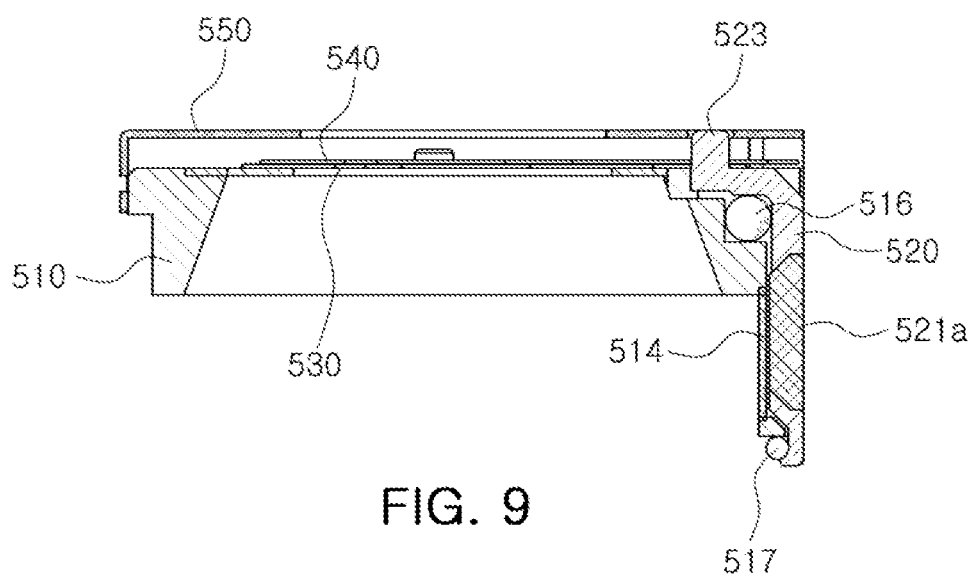
FIG. 9 is a side view of the first example of the stop module.

FIG. 8 is a perspective view of the first example of the stop module, and FIG. 9 is a side view of the first example of the stop module.

The stop module 500 is coupled to the lens module 200 and selectively changes the amount of light incident on the lens module 200.

Since the stop module 500 allows a relatively small amount of light to be incident on the lens module 200 under a high-illumination environment, and allows a relatively large amount of light to be incident on the lens module 200 under a low-illumination environment, quality of images may be constantly maintained under various illumination conditions.

The stop module 500 is coupled to the lens module 200 and moved together with the lens module 200 in the optical axis direction and the first and second directions.

Therefore, at the time of adjusting the focus and compensating for hand-shake, a distance between the lens module 200 and the stop module 500 is not changed.

Referring to FIG. 4, the stop module 500 includes a base 510, a first plate 530, a second plate 540, and a stop driving part. The stop module 500 further includes a cover 550 covering the base 510, the first plate 530, and the second plate 540.

Referring to FIGS. 5 and 6, a first through hole 531 is provided in the first plate 530, and a second through hole 541 is provided in the second plate 540.

Further, first and third guide holes 533 and 535 are provided in the first plate 530, and second and fourth guide holes 543 and 545 are provided in the second plate 540.

The first guide hole 533 is disposed to be inclined with respect to the third guide hole 535, and the second guide hole 543 is disposed to be inclined with respect to the fourth guide hole 545. Directions of inclination of the first and second guide holes 533 and 543 are opposite to each other when the first and second plates 530 and 540 are disposed on the base 510 in the stop module 500.

The first through hole 531 has a shape formed by connecting non-concentric through holes having different diameters to each other. The first through hole 531 may have a shape formed by connecting a through hole having a relatively large diameter and a through hole having a relatively small diameter to each other. As an example, the first through hole 531 in its entirety has a gourd shape.

The second through hole 541 has a shape formed by connecting non-concentric through holes having different diameters to each other. The second through hole 541 has a shape formed by connecting a through hole having a relatively large diameter and a through hole having a relatively small diameter to each other. As an example, the second through hole 541 in its entirety has a gourd shape.

The shapes of the first and second through holes 531 and 541 are opposite to each other when the first and second plates 530 and 540 are disposed on the base 510 in the stop module 500.

The first and second plates 530 and 540 are coupled to the base 510 so as to partially overlap each other in the optical axis direction, and are moved by the stop driving part. As an example, the first and second plates 530 and 540 are linearly moved in directions opposite to each other by the driving part.

The first and second through holes 531 and 541 partially overlap each other in the optical axis direction. The first and second through holes 531 and 541 partially overlap each other in the optical axis direction to form an aperture through which light passes.

The first and second through holes 531 and 541 partially overlap each other to form apertures having different diameters. As an example, the first and second through holes 531 and 541 partially overlap each other in first positions to form an aperture having a relatively large diameter, and the first and second through holes 531 and 541 partially overlap each other in second positions to form an aperture having a relatively small diameter.

Therefore, light may be incident through any one of the apertures depending on a photographing environment.

Referring to FIG. 7A, while the first and second plates 530 and 540 are moved by the stop driving part to the second position, the first and second through holes 531 and 541 partially overlap each other to form an aperture having a relatively small diameter.

Referring to FIG. 7B, while the first and second plates 530 and 540 are moved by the stop driving part to the first position, the first and second through holes 531 and 541 partially overlap each other to form an aperture having a relatively large diameter.

Referring to FIGS. 8 and 9, the stop driving part includes a magnet portion 520 disposed on the base 510 to be movable on one axis, and a coil 521b (FIGS. 2-4) fixed to the housing 110 to face the magnet portion 520.

The coil 521b may be provided on the board 900, and the board 900 may be fixed to the housing 110. The board 900 may be electrically connected to the printed circuit board 600.

The magnet portion 520 is a movable member moving together with the base 510 in the optical axis direction and the first and second directions, and the coil 521b is a fixed member fixed to the housing 110.

Since the coil 521b that provides driving force to the stop module 500 is disposed at the outside of the stop module 500, external to the stop module 500, that is, on the housing 110 of the camera module, a weight of the stop module 500 is decreased.

In other words, since the coil 521b that provides driving force to the stop module 500 is disposed as the fixed member, the coil 521b itself does not move at the time of performing an autofocusing function or an image stabilization function, and thus, an increase in weight of the lens module 200 caused by adopting the stop module 500 is not significantly increased.

The coil 521b that provides driving force to the stop module 500 is disposed in the housing 110 corresponding to the fixed member to thereby be electrically connected to the printed circuit board 600. Thus, even though the lens module 200 and the stop module 500 are moved at the time of performing the autofocusing function or hand-shake compensation function, there is no movement necessary of the coil 521b of the stop driving part.

Therefore, deterioration of the autofocusing and hand-shake compensation functions may be prevented.

A protrusion portion 512 in which the magnet portion 520 is disposed is provided on the base 510. The protrusion portion 512 is extended from the base 510 in the optical axis direction.

The magnet portion 520 includes a magnet 521a disposed to face the coil 521b and a magnet holder 522 to which the magnet 521a is attached.

The magnet portion 520 is coupled to the protrusion portion 512 of the base 510. A first yoke 514 is provided in the protrusion portion 512, and the magnet portion 520 is coupled to the protrusion portion 521 by attractive force between the first yoke 514 and the magnet 521a.

Here, the first yoke 514 and the magnet 521a do not come in contact with each other. To this end, a support portion supporting the magnet portion 520 is provided in the base 510.

The support portion includes a ball member 516 and further includes a guide shaft 517. As an example, the ball member 516 is provided in the base 510 as the support portion, and the guide shaft 517 is further provided.

An insertion groove into which the ball member 516 is inserted is provided in the base 510. The ball member 516 is inserted into the insertion groove, and is disposed in point-contact with the base 510 and the magnet portion 520.

The guide shaft 517 is disposed on the protrusion portion 512 of the base 510, and is disposed in line-contact with the magnet portion 520.

Therefore, when power is applied to the coil 521b, the magnet portion 520 is moved on one axis by electromagnetic interaction between the magnet 521a and the coil 521b.

The magnet portion 520 is moved on the one axis in a state in which the magnet portion 520 is supported by the ball member 516 and the guide shaft 517.

A second yoke 518 and a third yoke 519 are further provided in the protrusion portion 512. When the magnet portion 520 is moved in one direction along the one axis, the magnet portion 520 approaches the second yoke 518, and the magnet portion 520 moves away from the third yoke 519. When the magnet portion 520 is moved in the other direction along the one axis, the magnet portion 520 moves away from the second yoke 518, and the magnet portion 520 approaches the third yoke 519. Attractive force acts between the magnet portion 520 and the second yoke 518. Further, attractive force acts between the magnet portion 520 and the third yoke 519. Therefore, the second yoke 518 and the third yoke 519 can determine the stop position in the one direction of the magnet portion 520 and the stop position in the other direction of the magnet portion 520.

Although a case in which an upper portion of the magnet portion 520 is supported by the ball member 516 and a lower portion thereof is supported by the guide shaft 517 is illustrated in FIGS. 8 and 9, the magnet portion 520 is not limited thereto. That is, both the upper and lower portions of the magnet portion 520 may also be supported by the ball member 516 or the guide shaft 517.

A first projection portion 523 penetrating through the first and second plates 530 and 540 is provided in the magnet holder 522.

The first projection portion 523 is formed to pass through the first guide hole 533 of the first plate 530 and the second guide hole 543 of the second plate 540.

The first and second guide holes 533 and 543 are formed to be inclined with respect to a moving direction of the magnet portion 520, and the directions of inclination of the first and second guide holes 533 and 543 are opposite to each other.

Therefore, when the magnet portion 520 is moved on the one axis, the first projection portion 523 is moved in the first guide hole 533, and the first plate 530 is moved toward the magnet portion 520 or moved away from the magnet portion 520 depending on movement of the first projection portion 523 (see FIGS. 7A and 7B).

Further, when the magnet portion 520 is moved on the one axis, the first projection portion 523 is moved in the second guide hole 543, and the second plate 540 is moved away from the magnet portion 520 when the first plate 530 is moved toward the magnetic portion 520 or moved toward the magnet portion 520 when the first plate 530 is moved away from the magnetic portion 520 depending on movement of the first projection portion 523 (see FIGS. 7A and 7B).

Here, moving directions of the first and second plates 530 and 540 are substantially perpendicular to the moving direction of the magnet portion 520.

A second projection portion 513 inserted into the third guide hole 535 of the first plate 530 and the fourth guide hole 545 of the second plate 540 is formed on the base 510. As illustrated, second projection portion 513 includes second projection portions 513 disposed on opposite sides of the base 510. However, the disclosure is not intended to be so limited and, for example, can include a single projection portion 513 on one side of the base 510 when the third guide hole 535 and the fourth guide hole 545 are on the same side of the base 510.

The third and fourth guide holes 535 and 545 extend in a length direction perpendicular to the moving direction of the magnet portion 520.

The first and second plates 530 and 540 are guided and moved by the second projection portion 513 inserted into the third and fourth guide holes 535 and 545.

Rotation of the first plate 530 is prevented by the second projection portion 513 and the third guide hole 535. Further, rotation of the second plate 540 is prevented by the second projection portion 513 and the fourth guide hole 545.

Figure 10:
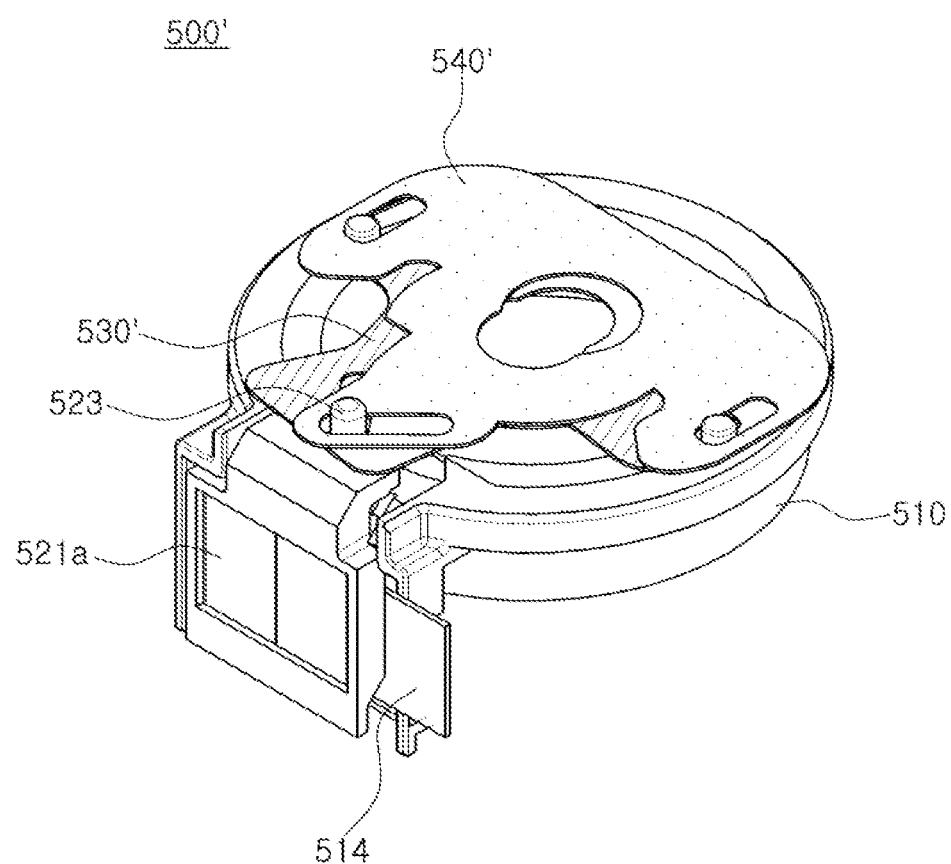
FIG. 10 is a perspective view of a second example of a stop module.
Figure 11:
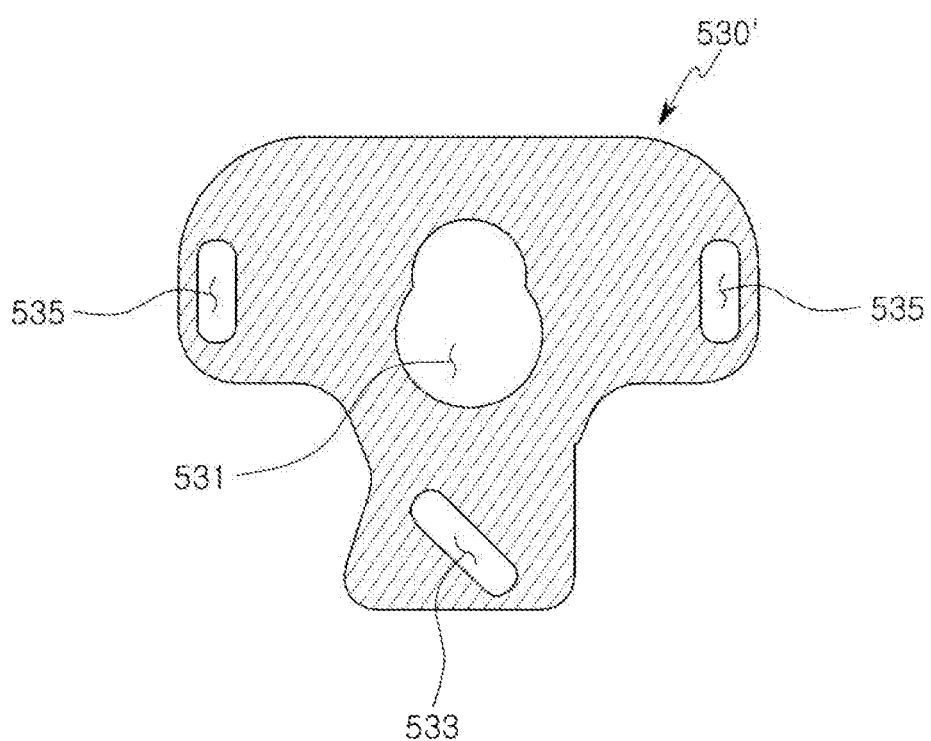
FIG. 11 is a plan view of a first plate provided in the second example of the stop module.
Figure 12:
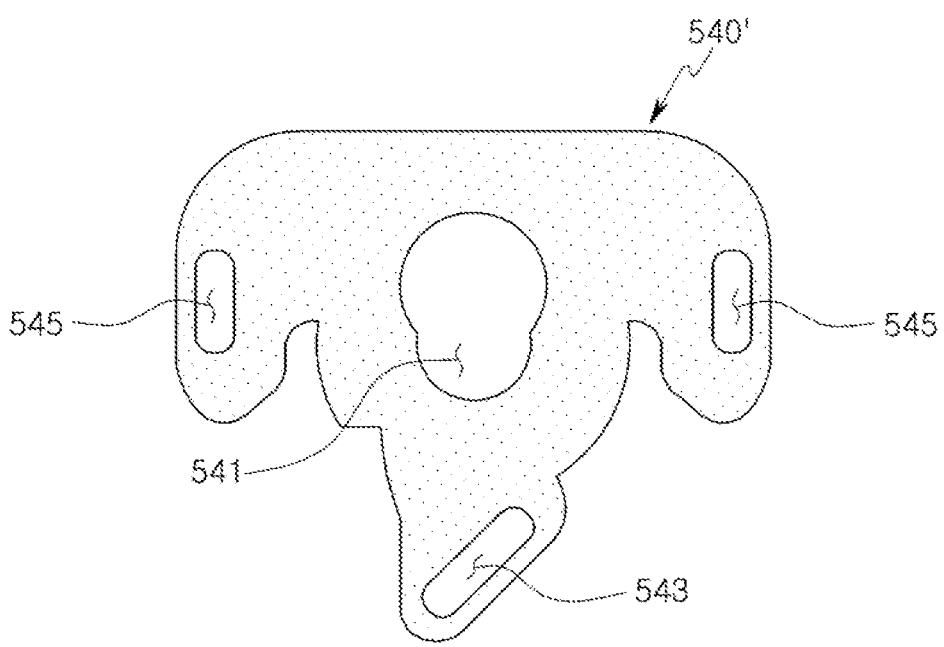
FIG. 12 is a plan view of a second plate provided in the second example of the stop module.

FIG. 10 is a perspective view of a second example of a stop module, FIG. 11 is a plan view of a first plate provided in the second example of the stop module of FIG. 10, and FIG. 12 is a plan view of a second plate provided in the second example of the stop module of FIG. 10.

Figure 13A:
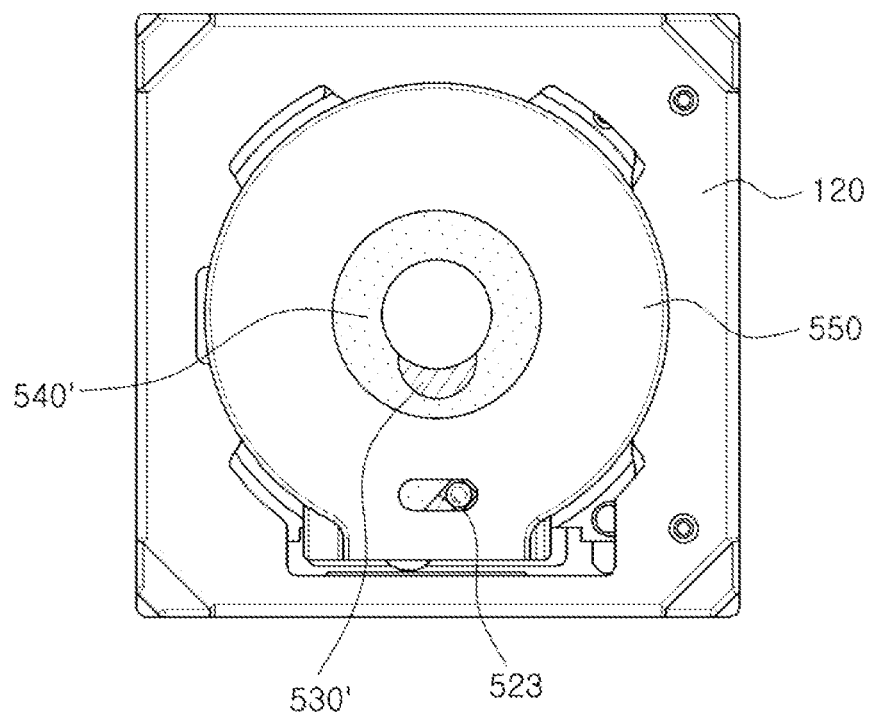
FIGS. 13A and 13B are plan views of the camera module, illustrating a state in which a diameter of an aperture through which light is incident is changed.
Figure 13B:
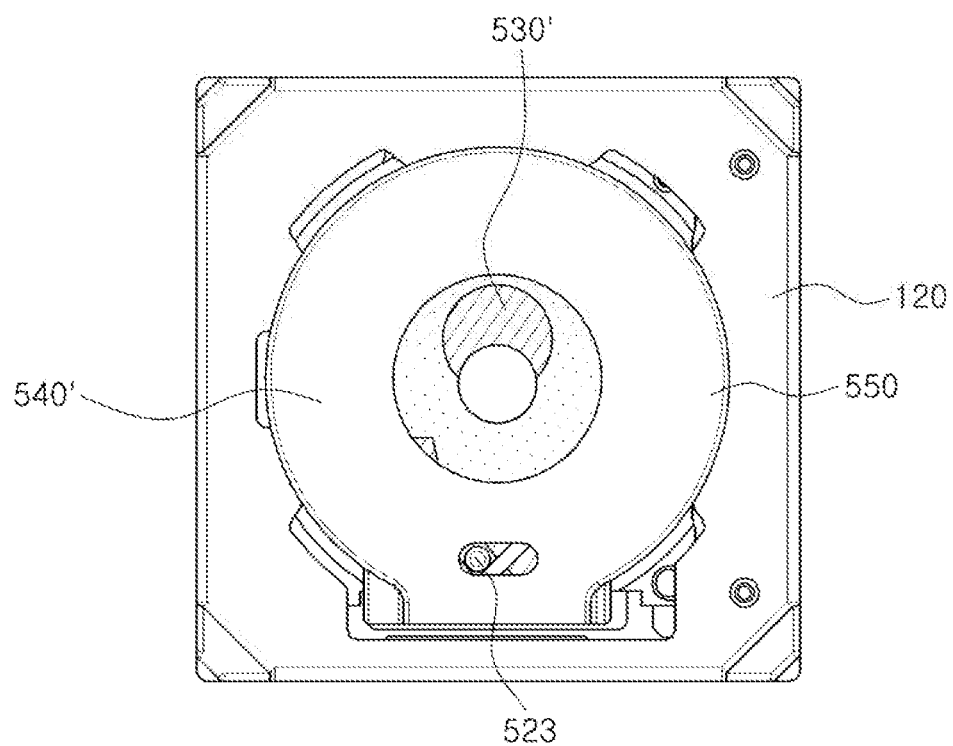

Further, FIGS. 13A and 13B are plan views of the camera module, illustrating a state in which a diameter of an aperture through which light is incident is changed.

Since a stop module 500' according to the second example is the same as the stop module 500 according the first example described above except for first and second plates 530' and 540', a further detailed description thereof except for the first and second plates 530' and 540' will be omitted.

In the first plate 530', a third guide hole 535 may be formed on both sides of the first through hole 531.

In the second plate 540', a fourth guide hole 545 may be formed on both sides of the second through hole 541.

A second projection portion 513 of the base 510 may be formed on both sides based on the first and second through holes 531 and 541 to correspond to the third and fourth guide holes 535 and 545.

Therefore, linear movement of the first and second plates 530' and 540' may be more stably conducted depending on movement of the magnet portion 520.

As set forth above, according to exemplary embodiments in the present disclosure, the camera module may selectively change the amount of incident light through the stop module, prevent performance of the autofocusing and hand-shake compensation functions from being deteriorated even through the stop module is mounted therein, and significantly reduce an increase in weight of the stop module on the lens module caused by adopting the stop module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module comprising at least two lenses stacked in an optical axis direction and disposed in a housing; and
   a stop module,
   wherein the stop module comprises:
   a first plate and a second plate stacked in the optical axis direction, wherein the first and second plates are configured to form apertures;

a magnet portion configured to drive the first plate and the second plate by movement of the magnet portion; and a coil fixedly disposed on the housing facing the magnet portion in a direction intersected with the optical axis direction, and configured to move the magnet portion linearly, wherein the stop module except for the coil is configured to move in the optical axis direction with the lens module.

2. The camera module of claim 1, wherein the stop module further comprises:

a base; and the first plate comprises a first through hole and the second plate comprises a second through hole disposed on the base, wherein the first and second through holes are configured to form the apertures.

3. The camera module of claim 2, wherein each of the first and second through holes comprises a shape of connected non-concentric through holes comprising different diameters.

4. The camera module of claim 3, wherein the apertures comprise the first through hole overlapped with the second through hole.

5. The camera module of claim 2, wherein the first and second plates are configured to move in directions opposite to each other by movement of the magnet portion.

6. The camera module of claim 2, wherein a first projection portion penetrating through the first and second plates is disposed on the magnet portion.

7. The camera module of claim 6, wherein the first plate comprises a first guide hole through which the first projection portion passes, the second plate comprises a second guide hole through which the first projection portion passes, wherein the first and second guide holes are inclined with respect to a moving direction of the magnet portion, and wherein directions of inclination of the first and second guide holes are opposite to each other.

8. The camera module of claim 7, wherein a second projection portion is disposed on the base, the first plate comprises a third guide hole into which the second projection portion is inserted, and the second plate comprises a fourth guide hole into which the second projection portion is inserted.

9. The camera module of claim 8, wherein the third and fourth guide holes extend in a length direction perpendicular to a moving direction of the magnet portion.

10. The camera module of claim 2, wherein the stop module further comprises a cover covering the base and the first and second plates.

11. The camera module of claim 1, wherein the lens module and the stop module are configured to be movable together in an optical axis direction.

12. The camera module of claim 11, wherein the lens module and the stop module are configured to be movable together in first and second directions perpendicular to the optical axis direction.

13. A camera module comprising:

a lens module comprising at least two lenses stacked in an optical axis direction and disposed in a housing; and a stop module coupled to the lens module, wherein the stop module comprises:

first and second plates stacked in the optical axis direction;

a magnet portion configured to be movable in a direction intersected with the optical axis direction; and a coil fixedly disposed on the housing facing the magnet portion in a direction intersected with the optical axis direction, and configured to move the magnet portion linearly, wherein an aperture is selected by movement of the magnet portion, and wherein the magnet portion is configured to move in the optical axis direction with the lens module.

14. The camera module of claim 13, wherein the first and second plates each comprise a through hole, wherein the through hole of the first plate and the through hole of the second plate overlap each other in an optical axis direction to selectively form the aperture comprising various diameters, wherein each through hole comprises a shape of connected non-concentric through holes comprising different diameters, and wherein the first and second plates are configured to move in directions opposite to each other by movement of the magnet portion.

15. The camera module of claim 13, wherein a support portion disposed on a base contacts and supports the magnet portion.

16. A camera module, comprising:

a housing;

a lens module movably disposed in the housing;

a stop module including plates, and disposed on the lens module, and comprising a magnet portion including a magnet; and a coil fixedly disposed on the housing spaced apart from the stop module, and configured to move the magnet portion, wherein the magnet is movable in an optical axis direction relative to the coil.

17. The camera module of claim 16, wherein the plates are configured to selectively slide over one another to first and second positions in response to movement of the magnet portion, wherein in the first position, first portions of the through holes overlap to form a first aperture, and in a second position, second portions of the through holes overlap to form a second aperture in a substantially same position on an optical axis as the first aperture.

18. The camera module of claim 16, wherein the magnet portion is configured to move in a first axis direction substantially perpendicular to an optical axis direction, and the plates are configured to move in a direction substantially perpendicular to the first axis and the optical axis directions, and in directions opposite to one another in response to movement of the magnet portion.

19. The camera module of claim 18, wherein the plates comprise inclined slots coupled to a first projection portion disposed on the magnet portion, and non-inclined slots coupled to a second projection portion disposed in a substantially constant position relative to the optical axis.

* * * * *